Jan. 1, 1929.
H. E. CRUMLICK
1,697,051
MOLD FOR MAKING FROZEN CONFECTIONS
Filed Aug. 19, 1926
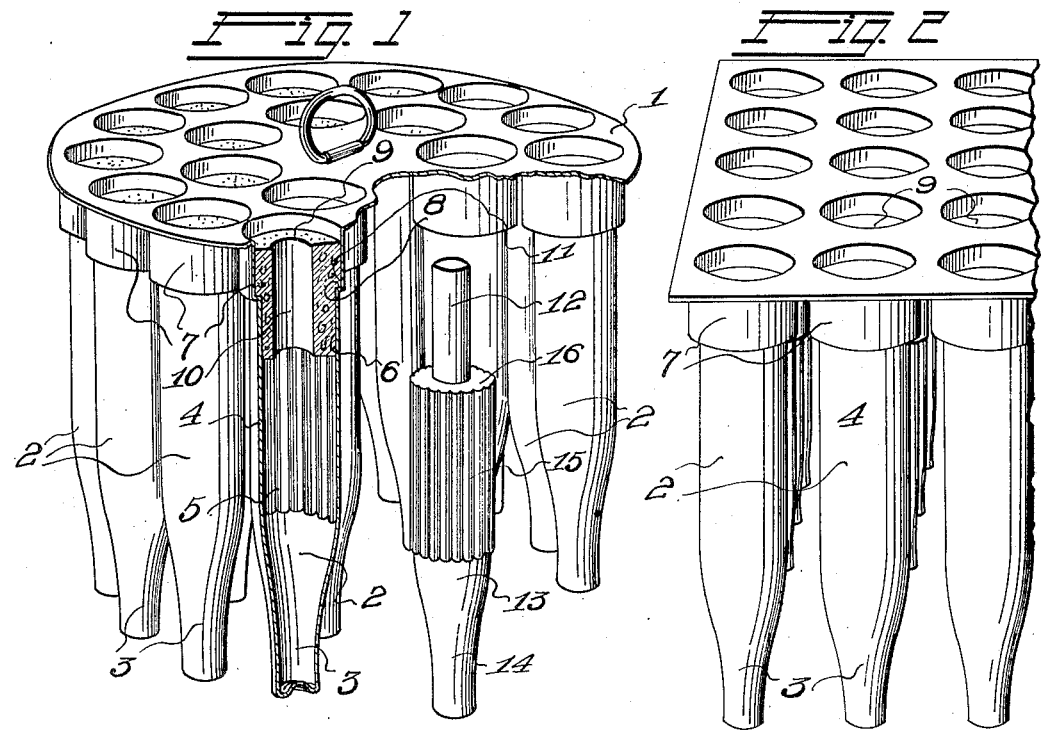
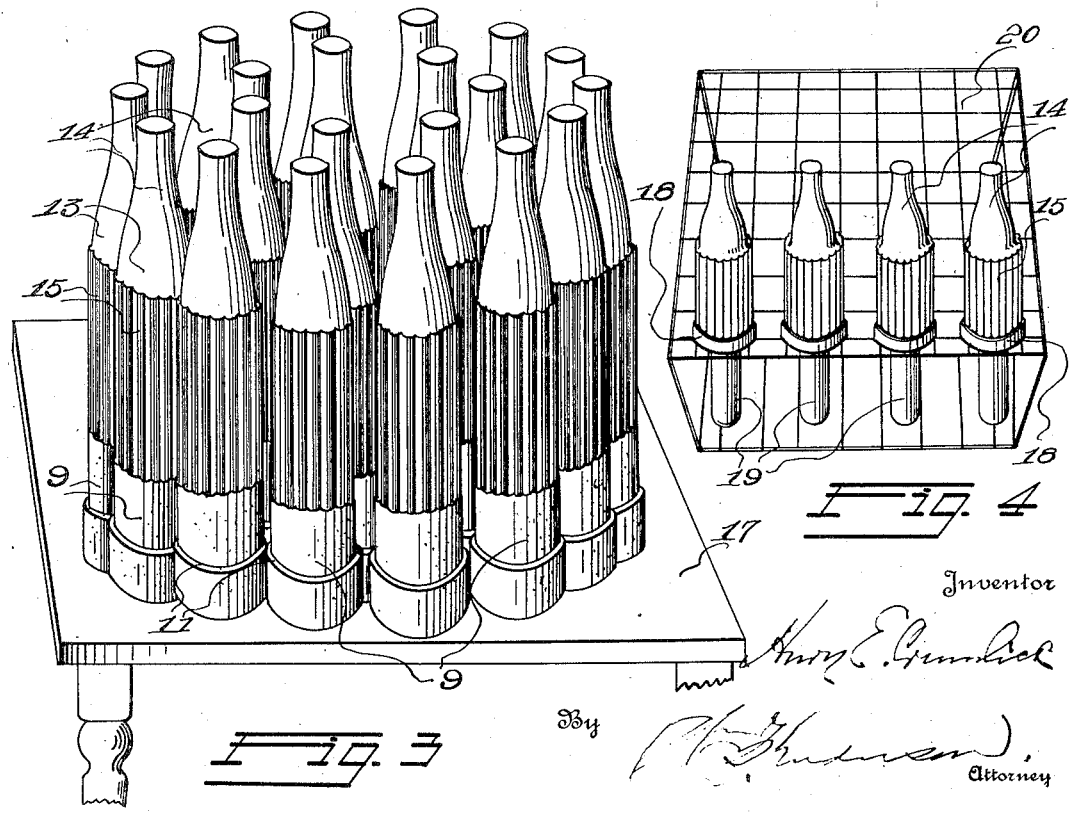
Inventor
Henry E. Crumlick
By
Attorney Patented Jan. 1, 1929.

1,697,051

UNITED STATES PATENT OFFICE.

HENRY E. CRUMLICK, OF DUNDALK, BALTIMORE, MARYLAND.

MOLD FOR MAKING FROZEN CONFECTIONS.

Application filed August 19, 1926. Serial No. 130,234.

My invention relates to molds for forming or shaping edible substances into selected designs or shapes and served in frozen-hard condition or state adapted to be eaten without the need of a spoon or other serving implement, the edible substance or confection being frozen-hard in the mold in which it is shaped, and while in the mold during the process of freezing formed with a handle or stem of the same substance as the body of the article and integral therewith and likewise in a frozen-hard condition so that the article may be handled by reason of the stem-handle without the hands gripping the body of the article, thus promoting sanitary conditions in dispensing the frozen-hard confection or edible substance.

To the accomplishment of the foregoing and such other objects as may hereinafter appear the invention consists in a mold of the character indicated shaped to give to the article the form or design desired and provided with a handle-forming core, removable from the mold and separable from the molded frozen-hard confection or edible-body after removal of the molded article from the freezing mold, as hereinafter particlarly described and then sought to be clearly defined by the claims, reference being had to the accompanying drawing, forming a part hereof, and in which Figure 1 is a perspective of one form of mold comprising a group of individual units, disposed in circular formation, with one of the units in vertical section, and showing some of the units broken away, and one of the molded articles illustrated in perspective;

Figure 2 is a perspective of a group mold of rectangular formation, with a portion broken away;

Figure 3 is a perspective view of a number of the molded articles after removal from the mold units and before separation from the handle-forming cores;

Figure 4 is a perspective of a tray for holding the individual molded articles during transportation or for storage until served to individual or group purchasers, four of the molded articles being illustrated.

In the drawing the numeral 1 designates a plate, which for convenience may be termed a cover plate, from which depend any desired number of individual molds, or units, of the desired form to be given to the article to be molded, the form illustrated being bottle-shaped. Each mold unit may be of metal molded to the shape or configuration desired and having its interior of the configuration or shape to be given to the article to be molded therein, or made of sheet-metal and stamped or struck-up with the desired design or configuration. In the configuration selected for illustration, the molds are in the shape of a bottle with a tapering neck 3, closed at its end, and the body portion 4 formed with longitudinally extending flutings or corrugations 5 extending for part of its length and the remaining portion formed preferably with a plain wall surface 6 and the portion 7 next to its open end enlarged in diameter to form an internal shoulder 8 where the enlarged portion joins the other portion as illustrated in Figure 1 of the drawing. The enlarged portion 7 and the adjacent smooth walled portion 6 serve to receive a removable core 9 preferably of cork and formed with a central bore 10 and having an external shoulder 11 which will seat or rest upon the internal shoulder 8 of the cylindrical portion of the mold proper. This core with its central bore 10 serves to form a reduced portion or stem 12 at the end of the article 13 molded in the cavity of the mold, the article in the particular illustration given being bottle-shaped with a tapering neck 14 and flutings 15 on its external wall and a flattened base 16 with the stem or handle 12 extending therefrom. While it is preferred to mold the article in the shape or design illustrated, the invention in scope is more comprehensive, and in the main comprises the hollow-body of appropriate design to mold the frozen-hard body of the article and the removable core to mold a handle integral with the body-portion of the molded article for hand manipulation of the molded frozen-hard edible article.

The group of molds, when filled with the liquid to be frozen, is suspended in a freezing tank or receptacle of a selected electric, or freezing mixture type, wherein the liquid in the units of the mold is frozen-hard into a solid body capable of being hand-manipulated when removed from the mold units, and when thus frozen-hard the mold is removed from the freezing receptacle and dipped in a body of warm liquid, or otherwise, so that when the mold is inverted or turned up-side-down the frozen-hard molded article will slide out of the mold and be received upon a suitable support, for instance, upon a table-top or platform 17, the core of each unit serving to support the molded article in an upright position, and also serving to protect the molded stems of the articles against breakage even though in discharging the frozen-hard articles from the units of the mold some of the articles should topple over and lie flat instead of upright upon the table. Having discharged the frozen-hard molded articles from the mold, the next step is to separate the article from the core which may be done by grasping the core with one hand and the body of the article with the other hand, with a waxed or paraffined paper wrapper or container placed about the article so as to avoid direct contact of the hand with the frozen-hard article, and then withdraw the core from the stem of the article. The next step is to replace the withdrawn core with a waxed or paraffined paper cap or cup-shaped holder comprising a cup-shaped portion 18 to fit over the base of the molded article and a tubular portion 19 to receive the stem or handle of the frozen-hard article, and by which the molded article may be handled without the hand coming in direct contact with the frozen-hard molded article and thus sanitary conditions be promoted. The molded articles with the protective cap holders applied may now be assembled in a grated container 20 as illustrated in Figure 4 of the drawing and the container placed in a refrigerator or cooling chamber for transportation or storage or for service to group or individual purchasers or consumers as occasion arises.

The circular type of grouped molds are designed more particularly for use of merchants or dealers in the smaller cities or country who do not need as large an equipment as in large cities. For freezing plants in the larger cities the grouped molds may be in rectangular arrangement as illustrated in Figure 2, the large plants having greater facilities for operation than smaller places and for economy of space may prefer the rectangular arrangement of mold units. In either form, however, the essential features described will be employed for the individual units of the grouped molds, and the detail illustration and description for one type will answer for both types.

I have illustrated and described with particularity the preferred details of construction but it will be understood from the description that changes may be made and essential features of the invention retained.

It may be stated that the substance to be frozen may be water flavored as desired, and to which particles of crushed or macerated fruits may be added to give tenacity or tensile strength to the body of the frozen body, although other liquids suitable for the purpose may be used as the substance to be frozen into a hard body.

Having described my invention and set forth its merits, what I claim is:—

1. A mold for forming frozen-hard edible substances comprising a hollow-body of the configuration of the article to be molded and adapted to hold in liquid form the substance to be frozen, and a removable core shaped to form a frozen-hard handle integral with the body of the molded article, said core adapted to fit into the hollow-body and separable therefrom, the core and frozen article being removable together from the hollow-body of the mold.

2. A mold for forming frozen-hard edible substances comprising a coupled-group of individual hollow-bodies each of the configuration of the articles to be molded and a removable handle-forming core for each unit of the group, each unit of the group having its body portion formed with an open-end of enlarged diameter for the simultaneous discharge of the molded article and core upon reversal of the coupled-group of individual hollow bodies.

3. A mold for forming frozen-hard edible substances comprising a coupled-group of individual hollow bodies each of the configuration of the articles to be molded and a removable handle-forming core for each unit of the group, each core adapted to fit in one end of its receiving unit and formed with a bore positioned to shape a frozen-hard handle integral with the body of the molded article and form an off-set shoulder between the base of the handle and outside wall of the article molded.

4. A mold for forming frozen-hard edible substances comprising a coupled-group of individual bottle-shaped hollow bodies having longitudinally extending flutings, and a removable handle-forming core for each unit of the group, each core being formed with a central bore to form a frozen-handle integral with the body of the molded article, each core adapted to fit in the hollow body portion of its unit and removable therefrom simultaneously with the molded article, the core also being separable from the molded article upon removal of the article and core from the individual units.

In testimony whereof I affix my signature.

HENRY E. CRUMLICK.